United States Patent
Chang et al.

(10) Patent No.: US 8,010,599 B2
(45) Date of Patent: *Aug. 30, 2011

(54) METHOD, SYSTEM, AND GRAPHICAL USER INTERFACE FOR DYNAMICALLY UPDATING TRANSMISSION CHARACTERISTICS IN A WEB MAIL REPLY

(75) Inventors: Bay-Wei Chang, Foster City, CA (US); Jing Yee Lim, Santa Clara, CA (US); Sanjeev Singh, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 901 days.

This patent is subject to a terminal disclaimer.

(21) Appl. No.: 11/961,911

(22) Filed: Dec. 20, 2007

(65) Prior Publication Data

US 2008/0098312 A1    Apr. 24, 2008

Related U.S. Application Data

(60) Continuation of application No. 11/522,549, filed on Sep. 13, 2006, now Pat. No. 7,315,880, which is a division of application No. 10/815,284, filed on Mar. 31, 2004, now Pat. No. 7,269,621.

(51) Int. Cl.
*G06F 15/173*    (2006.01)

(52) U.S. Cl. ....................................................... 709/203

(58) Field of Classification Search .................. 709/203, 709/206
See application file for complete search history.

(56) References Cited

U.S. PATENT DOCUMENTS

| | | | |
|---|---|---|---|
| 5,208,748 A | 5/1993 | Flores et al. | |
| 5,216,603 A | 6/1993 | Flores et al. | |
| 5,613,108 A | 3/1997 | Morikawa | 393/616 |
| 5,734,837 A | 3/1998 | Flores et al. | |
| 5,740,549 A | 4/1998 | Reilly et al. | 705/14 |
| 5,761,689 A | 6/1998 | Rayson et al. | 707/533 |
| 5,832,502 A | 11/1998 | Durham et al. | 707/104 |
| 5,905,863 A | 5/1999 | Knowles et al. | 395/200.36 |
| 5,913,040 A | 6/1999 | Rakavy et al. | 395/200.62 |
| 5,948,058 A | 9/1999 | Kudoh et al. | 709/206 |
| 6,021,427 A | 2/2000 | Spagna et al. | |
| 6,029,164 A | 2/2000 | Birrell et al. | 707/3 |

(Continued)

FOREIGN PATENT DOCUMENTS

EP    0886228 A2    12/1998

(Continued)

OTHER PUBLICATIONS

Comer, D. and Peterson, L., "Conversation-Based Mail," ACM Transactions on Computer Systems (TOCS) vol. 4, Issue 4, pp. 299-319, Nov. 1986.

Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.

(Continued)

Primary Examiner — David Y Eng
(74) Attorney, Agent, or Firm — Morgan, Lewis & Bockius LLP

(57) ABSTRACT

A method, system and graphical user interface for dynamically updating transmission characteristics in a web mail reply are described. In one embodiment of the invention, a graphical user interface includes a web mail reply form that includes: one or more address fields; an input area for inputting a reply message; and a plurality of response options selectable by a user. In response to selection of a response option by a user, one or more of the address fields in the reply form are changed while maintaining the reply message in the input area.

24 Claims, 13 Drawing Sheets

U.S. PATENT DOCUMENTS

| | | | |
|---|---|---|---|
| 6,085,206 A | 7/2000 | Domini et al. | 707/533 |
| 6,151,596 A | 11/2000 | Hosomi | 707/1 |
| 6,185,551 B1 | 2/2001 | Birrell et al. | |
| 6,330,589 B1 | 12/2001 | Kennedy | 709/206 |
| 6,350,066 B1 | 2/2002 | Bobo, II | 395/200.36 |
| 6,493,702 B1 | 12/2002 | Adar et al. | 707/3 |
| 6,493,703 B1 | 12/2002 | Knight et al. | 707/3 |
| 6,549,957 B1 | 4/2003 | Hanson et al. | |
| 6,594,693 B1 | 7/2003 | Borwankar | 709/219 |
| 6,606,644 B1 | 8/2003 | Ford et al. | 709/203 |
| 6,665,668 B1 | 12/2003 | Sugaya et al. | 707/6 |
| 6,683,627 B1 | 1/2004 | Ullmann et al. | 345/786 |
| 6,708,205 B2 | 3/2004 | Sheldon et al. | 709/206 |
| 6,725,228 B1 | 4/2004 | Clark et al. | 707/102 |
| 6,745,197 B2 | 6/2004 | McDonald | 707/102 |
| 6,757,889 B1 | 6/2004 | Ito | 717/112 |
| 6,771,291 B1 | 8/2004 | DiStefano, III | 345/762 |
| 6,785,869 B1 | 8/2004 | Berstis | 715/532 |
| 6,820,081 B1 | 11/2004 | Kawai et al. | 707/7 |
| 6,889,361 B1 | 5/2005 | Bates et al. | 715/533 |
| 6,892,196 B1 | 5/2005 | Hughes | 707/4 |
| 6,973,481 B2 | 12/2005 | MacIntosh et al. | 709/206 |
| 7,017,173 B1 | 3/2006 | Armstrong et al. | 725/87 |
| 7,035,903 B1 | 4/2006 | Baldonado | 709/206 |
| 7,043,690 B1 | 5/2006 | Bates et al. | 715/533 |
| 7,089,278 B1 | 8/2006 | Churchill et al. | 709/203 |
| 7,120,668 B2 | 10/2006 | Manber et al. | 709/205 |
| 7,139,850 B2 | 11/2006 | Amemiya et al. | 710/48 |
| 7,143,135 B2 | 11/2006 | Smith et al. | 709/204 |
| 7,356,772 B2 | 4/2008 | Brownholtz et al. | 715/752 |
| 7,359,936 B2 | 4/2008 | Gruen et al. | 709/203 |
| 7,383,307 B2 | 6/2008 | Kirkland et al. | 709/206 |
| 7,421,690 B2 | 9/2008 | Forstall et al. | 718/100 |
| 7,433,920 B2 | 10/2008 | Blagsvedt et al. | 709/204 |
| 7,484,175 B2 | 1/2009 | Kirkland | 715/751 |
| 7,599,852 B2 | 10/2009 | Bosarge et al. | 705/14 |
| 2001/0016845 A1 | 8/2001 | Tribbensee | 707/10 |
| 2001/0042100 A1 | 11/2001 | Guedalia et al. | 709/206 |
| 2001/0047294 A1 | 11/2001 | Rothschild | 705/14 |
| 2002/0010775 A1 | 1/2002 | Rakavy et al. | 709/224 |
| 2002/0194229 A1 | 12/2002 | Decime et al. | 707/533 |
| 2003/0009385 A1 | 1/2003 | Tucciarone et al. | 705/26 |
| 2003/0020749 A1 | 1/2003 | Abu-Hakima et al. | 345/752 |
| 2003/0055711 A1 | 3/2003 | Doherty | 705/10 |
| 2003/0093315 A1 | 5/2003 | Sato | 705/14 |
| 2003/0101065 A1 | 5/2003 | Rohall et al. | 705/1 |
| 2003/0110227 A1 | 6/2003 | O'Hagan | 709/206 |
| 2003/0145285 A1 | 7/2003 | Miyahira et al. | 715/533 |
| 2003/0163537 A1 | 8/2003 | Rohall et al. | 709/206 |
| 2003/0167310 A1 | 9/2003 | Moody et al. | 709/206 |
| 2003/0233419 A1 | 12/2003 | Beringer | 709/206 |
| 2004/0054737 A1 | 3/2004 | Daniell | 709/206 |
| 2004/0059712 A1 | 3/2004 | Dean et al. | 707/1 |
| 2004/0078432 A1 | 4/2004 | Manber et al. | 709/205 |
| 2004/0133564 A1 | 7/2004 | Gross et al. | 707/3 |
| 2004/0199589 A1 | 10/2004 | Keohane et al. | 709/206 |
| 2004/0205141 A1 | 10/2004 | Goland | 709/206 |
| 2004/0210587 A1 | 10/2004 | Reysa | 707/100 |
| 2004/0260710 A1 | 12/2004 | Marston et al. | 707/100 |
| 2004/0260756 A1 | 12/2004 | Forstall et al. | 709/200 |
| 2005/0004990 A1 | 1/2005 | Durazo et al. | 709/206 |
| 2005/0060643 A1 | 3/2005 | Glass et al. | 715/501.1 |
| 2005/0086598 A1 | 4/2005 | Marshall, III et al. | 715/530 |
| 2005/0091320 A1 | 4/2005 | Kirsch et al. | 709/206 |
| 2005/0114781 A1 | 5/2005 | Brownholtz et al. | 715/733 |
| 2005/0138002 A1 | 6/2005 | Giacobbe et al. | 707/3 |
| 2005/0144157 A1 | 6/2005 | Moody et al. | 707/3 |
| 2005/0144241 A1 | 6/2005 | Stata et al. | 709/206 |
| 2005/0198173 A1 | 9/2005 | Evans | 709/206 |
| 2005/0198256 A1 | 9/2005 | Moody et al. | 709/224 |
| 2005/0223066 A1 | 10/2005 | Buchheit et al. | 709/206 |
| 2006/0123091 A1 | 6/2006 | Ho | 709/206 |
| 2006/0248209 A1 | 11/2006 | Chiu et al. | 709/231 |
| 2007/0047697 A1 | 3/2007 | Drewry et al. | 379/88.13 |
| 2007/0067404 A1 | 3/2007 | Brown et al. | 709/206 |
| 2007/0143411 A1 | 6/2007 | Costea et al. | 709/206 |
| 2007/0143428 A1 | 6/2007 | Kumar et al. | 709/206 |
| 2007/0198639 A1 | 8/2007 | Litwin et al. | 709/206 |
| 2008/0147815 A1 | 6/2008 | Damm et al. | 709/206 |
| 2008/0313292 A1 | 12/2008 | Forstall et al. | 709/206 |

FOREIGN PATENT DOCUMENTS

| | | |
|---|---|---|
| JP | 9-128407 A | 5/1997 |
| JP | 2002-359667 A | 12/2002 |
| JP | 2003-108278 A | 4/2003 |
| WO | WO 00/23931 A2 | 4/2000 |
| WO | WO 03/058519 A2 | 7/2003 |

OTHER PUBLICATIONS

Bellotti, V. et al., "Taskmaster: recasting email as task management," PARC, CSCW '02 Workshop on Redesigning Email for the 21st Century.

Flores, F. et al., "Computer Systems and the design of organizational interaction," ACM Transactions on Information Systems., pp. 153-172, (1988).

Shepherd, A. et al., "Strudel-an extensible electronic conversation toolkit," Proceedings of the 1990 ACM Conference on Computer-supported Cooperative Work, Los Angeles, California, United States, pp. 93-104.

Venolia, G., et al., "Supporting Email Workflow," Technical Report MSR-TR-2001-88, Microsoft Corporation, 10 pages (Sep. 2001).

Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action is," pp. 256A-260, Byte, Dec. 1988.

Zawinski, J., "Message Threading," http://www.jwz.org/doc/threading.html, pp. 1-9 (1997-2000).

Apple Computer, Inc., Mail 1.3.3. Help: Checking Spelling in Email, http://docs.info.apple.com/article.html?artnum=151474 (Feb. 18, 2004).

Apple Computer Inc., Mac mail utility screenshot (Aug. 18, 2004).

Screenshot of reply to message in Lotus Notes 6.5.

About Microsoft Word screen shot, May 28, 2007, 1 page.

Courter, *Mastering Microsoft Office 2000—Professional Edition*, 1999 published by Sybex Inc., pp. 36-37 and 92-94.

Courter, *Mastering Microsoft Office 2000—Professional Edition*, 1999 published by Sybex Inc., p. 5.

International Preliminary Report on Patentability, PCT/US2005/006826, Oct. 4, 2006, 4 pages.

International Search Report and Written Opinion, PCT/US05/06826, Jun. 26, 2006, 7 pages.

International Search Report and Written Opinion, PCT/US2005/010137, Jun. 3, 2005, 11 pages.

O'Hara, Easy Microsoft Outlook 2003, Que, Sep. 18, 2003, 44 pages.

Russel, Special Edition Using Microsoft Office Outlook 2003, Que, Sep. 25, 2003, 102 pages.

Supplementary European Search Report, EP Application 05724384.2, Mar. 16, 2009, 5 pages.

Syroid, Outlook 2000 in a Nutshell, O'Reilly Media, May 2, 2000, pp. 1-66.

Tobias, Dan's Mail Format Site, Aug. 3, 2003, http://web.archive.org/web/20030820225908/http://mailformat.dan.info/config/yahoo.html, 6 pages.

500

From: Client A
To: Client B
Cc: Client C

What time should we meet for dinner?

Reply

520

From: Client C
To: Client A, Client B

How about 7:00? Where should we meet?

200

| Reply | Reply-to-All | Forward |

To: Client C
Cc:
Subject: Re: Dinner

7:00 works for me. Lets meet at the corner of Main and Washington.

[Send]

From: Client B
To: Client A

Are you working today?

Reply

From: Client A
To: Client B
Cc: Client C
Subject: Dinner

What time should we meet for dinner?

Reply

From: Client C
To: Client A, Client B
Subject: re: Dinner

How about 7:00? Where should we meet?

Reply

From: Client B
To: Client A
Subject: re: Dinner

7:00 works for me. Lets meet at the corner of Main and Washington.

Reply

From: Client B
To: Client A
Subject: re: Dinner

Are you working today?

Reply

700

710
Providing a reply form for responding to a first electronic mail message

720
Providing a plurality of response options

730
Detecting a selection of one of the plurality of response options

740
Dynamically updating the recipient addresses of the response message in response to the selected response option

Figure 7

METHOD, SYSTEM, AND GRAPHICAL USER INTERFACE FOR DYNAMICALLY UPDATING TRANSMISSION CHARACTERISTICS IN A WEB MAIL REPLY

RELATED APPLICATIONS

This application is a continuation of U.S. patent application Ser. No. 11/522,549, filed Sep. 13, 2006, now U.S. Pat. No. 7,315,880, which in turn is a divisional of Ser. No. 10/815,284, filed Mar. 31, 2004, now U.S. Pat. No. 7,269,621, both of which are incorporated by reference herein in their entireties.

This application is related to pending U.S. patent application Ser. No. 10/816,428, "Email System with Conversation-Centric User Interface", filed Mar. 31, 2004, and U.S. patent application Ser. No. 10/816,427, "Email Conversation Management System", filed Mar. 31, 2004. The disclosures of all of the foregoing applications are incorporated by reference herein in their entireties.

TECHNICAL FIELD

The present invention relates generally to Internet technology, and more particularly, to electronic mail (email) technology.

BACKGROUND

The importance of email technology in society today is well known. Email applications have become a common tool in both business and personal communication. A significant factor in the widespread adoption of email technology is the relative ease with which individuals may communicate using email. An individual may quickly communicate a message to one or more individuals by simply inputting the message and the recipients' email address into an email application and clicking a mouse button. One of the primary reasons email is so attractive is that the messages are typically delivered within seconds of being sent.

FIG. 1 illustrates an exemplary network on which email messaging may occur. As shown, each of the computer clients, Client A 120, Client B 121, Client C 122, and Client D 123, are coupled to a network 100. This network may be a private network, a public network such as the Internet, or a combination thereof. The computer clients (120, 121, 122, 123) are able to communicate with each other through virtual connections over network 100. These virtual connections allow the clients (120, 121, 122 and 123) to send and receive electronic mail messages from the other clients.

Many email users access their email through web mail applications which display a user's email inbox and the corresponding email messages in a web page environment. One of the advantages of web mail applications is that the user may access their email from any location that provides access to the World Wide Web. When a user logs into their email account, they are typically presented with an inbox view that provides a list of the various email messages the user has received. When the user selects a particular email message, for example, by clicking on the message within the list, a request is sent to a web server requesting the selected message. The server responds with the email message which is displayed to the user as a new web page.

Typically, the web page displaying the message includes one or more response options. Examples of response options include Reply, Reply-to-All and Forward. These response options are usually presented to the user as links or buttons that the user may select. Reply allows the user to reply to the originator of the message. Reply-to-All allows the user to reply to all of the recipients of the message. The Forward option allows the user to forward the email to a user who was not one of the original recipients of the message.

When a user selects one of the response options in a web based email application, a request is sent to a remote email server requesting the reply web page corresponding to the selected response option. This page typically includes a text box for inputting the reply message and one or more address fields for inserting the recipient addresses. When the user selects the Reply or Reply-to-All option, the server typically inserts the appropriate recipient address information into the address fields.

Typically, a user must choose the response option at the time he decides to respond to the email. If the user later changes his mind and wants to select a different response option, he cannot do so from the reply web page returned by the server. In order to select a different response option, the user would have to return to the original message web page. This process may result in multiple requests to the server which increases web traffic and adds additional latency to the user experience. If the user provides part or all of a response message into the reply web page before changing his mind on the response options, the user would lose the message unless he copied the message before returning to the original message and pasted it into the new reply web page returned by the server upon selecting the new response option.

These same limitations are also present in client-side email applications such as Microsoft Outlook. When the user selects a particular response option, a new message window is created including the recipient addresses associated with the response option. However, if the user wishes to change to a different response option, the user must close the window and select a different response option. These applications do not provide the user with a mechanism to dynamically change the response option for his message. As a result, if the user has provided part or all of a message prior to deciding to select a different response option, the user must either copy the message and paste it into the new reply window, or must manually enter the additional recipient addresses.

Accordingly, what is desirable are improved systems and methods for addressing the above-described limitations of prior systems.

SUMMARY

The present invention provides a system and method for dynamically updating the recipient email addresses of a response message in response to a user selection of a response option. In one embodiment, a reply form may be provided as an interface to respond to an email message. The reply form may comprise a text box for inputting a response message and a recipient email address box for inputting the email addresses of the intended recipients of the response message. In one embodiment, a plurality of response options may be provided with the reply form. When a user selects a response option, the recipient addresses of the response message may be dynamically updated with the email addresses associated with the response option.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIG. 6A illustrates an email thread 500 with a dynamically inserted reply form 200 according to one embodiment of the invention.

FIG. 6B illustrates an email thread 500 with an inserted response message according to one embodiment of the invention.

FIG. 7 is a flowchart for updating the recipient addresses of a response email in response to user selection of a response option according to one embodiment of the invention.

DESCRIPTION OF EMBODIMENTS

An apparatus and method for dynamically updating at lease one email transmission characteristic of a reply form without modifying the text message within the reply form is described. Email transmission characteristics include but are not limited to the recipient addresses of the response message, security parameters, quality of service characteristics or the priority level assigned to the response message. One skilled in the art will recognize that there are a number of email transmission characteristics that may be modified according to the present invention.

In one embodiment, the recipient addresses of a response message may be dynamically updated in response to a user selection of one of a plurality of response options. In one embodiment, a reply form associated with a received email message may be displayed to a user. The reply form may include multiple response options, a text box for inputting the response message and one or more address fields for adding and or editing the email addresses of the intended recipients of the response message. In response to a user selection of a response option, the recipient addresses of the response message may be dynamically populated based upon the selected response option.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, exemplary ones of which are described below, may be utilized in any electronic mail application. Accordingly, structures and devices shown below in block diagram are illustrative of specific embodiments of the invention and are meant to avoid obscuring the invention.

Reference in the specification to "one embodiment," "this embodiment" or "an embodiment" means that a particular feature, structure, characteristic, or function described in connection with the embodiment is included in at least one embodiment of the invention. The appearances of the phrase "in one embodiment" or "in an embodiment" in various places in the specification are not necessarily all referring to the same embodiment.

Figure 1:
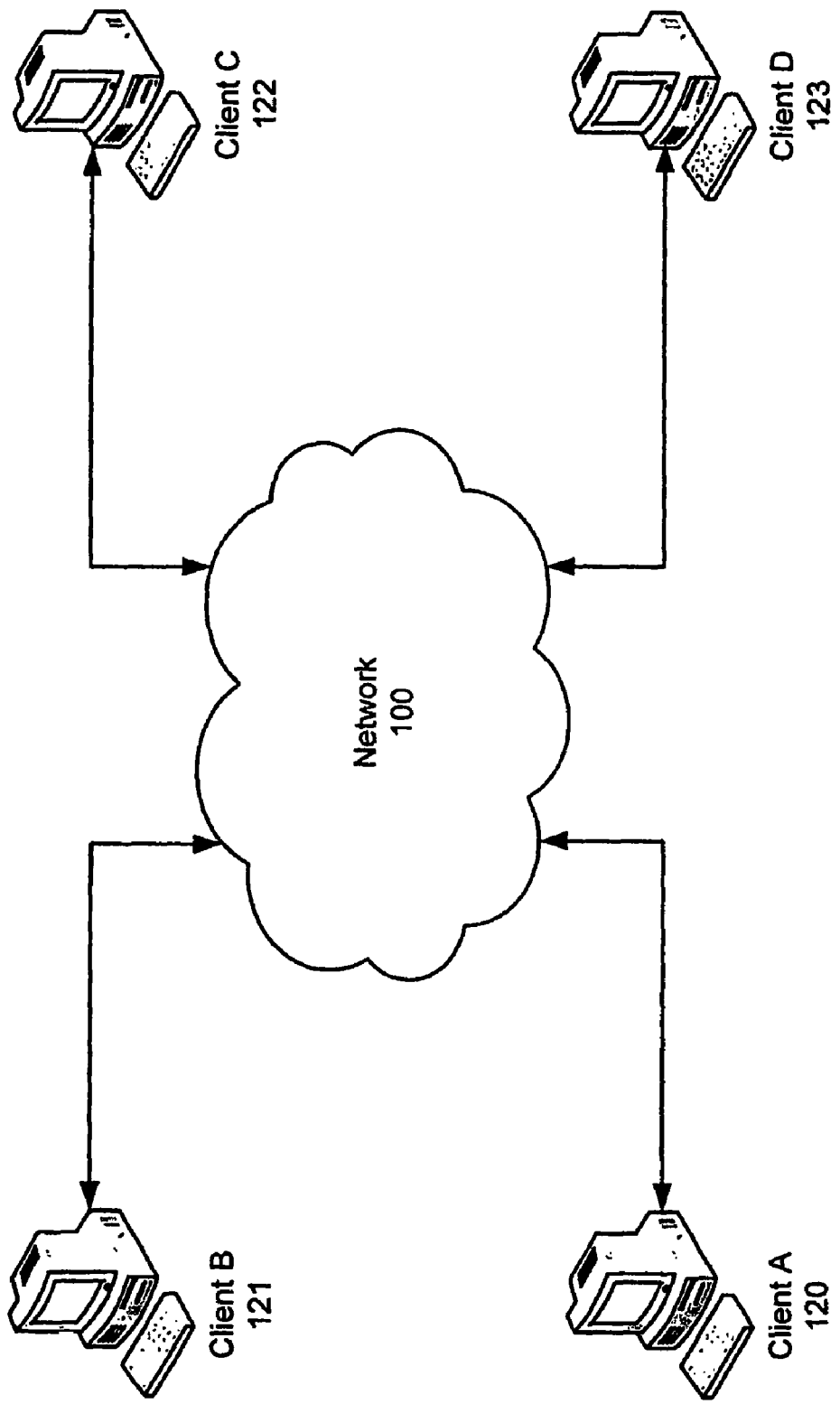
FIG. 1 illustrates an exemplary block diagram of a network on which email messages may be transmitted.
Figure 2A:
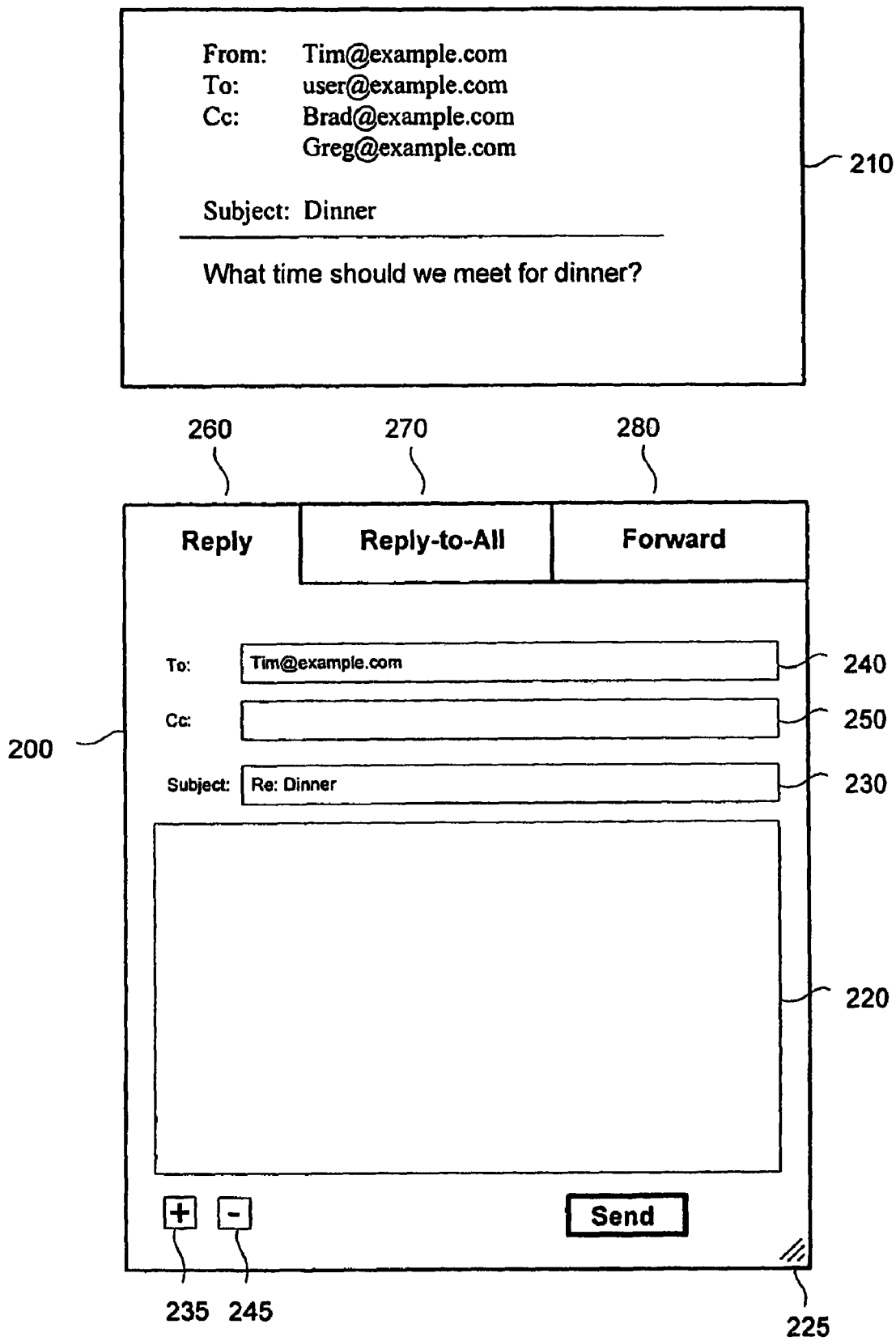
FIG. 2A illustrates a reply form 200 according to one embodiment of the invention.

FIG. 2A illustrates an exemplary reply form 200 according to one embodiment of the invention. Reply form 200 may provide an interface for the user to respond to a previously received email message 210. Reply form 200 may be located within the same window or document (e.g. web page) as the received email message. Reply form 200 may include a content area, such as text box 220, for typing or otherwise inputting the response message, a subject box 230 for entering a subject for the response message, and one or more recipient address boxes for inserting the email addresses of the recipients to which the user wishes to send the response message. In the embodiment illustrated in FIG. 2A, reply form 200 may include two recipient address boxes, 240 and 250. Reply form 200 may also include resize options that allow the user to dynamically resize reply form 200 or text box 220. In one embodiment, resize buttons 235 and 245 may be selected by the user to increase or reduce the number of lines of text available in reply form 200 or text box 220. Software code may detect a user selection of resize button 235 or 245 and may dynamically add or subtract a predefined number of lines of text from text box 220 within reply form 200. Alternatively, a control corner 225 may be provided to the user which the user may select and drag across the screen to increase the size of reply form 200 or text box 220. Reply form 200 may also include multiple response options. In one embodiment, reply form 200 may include three response options, Reply 260, Reply-to-All 270 and Forward 280.

In one embodiment, email message 210 is the message the user is responding to using reply form 200. As illustrated in FIG. 2A, email message 210 was sent to the user from Tim@example.com. In addition, Tim copied, denoted by "Cc:," Brad@example.com and Greg@example.com. Thus, Brad, Greg and the user each received a copy of email message 210.

Reply form 200 may be generated to allow the user to respond to email message 210 and may be displayed in the same window or document (e.g. web page) as email message 210. In an alternative embodiment, reply form 200 may be displayed in a separate window or frame from email address 210. In one embodiment, illustrated in FIG. 2B, a minimized reply form 215 may be inserted below email message 210. Minimized reply form 215 may include response options 260, 270 and 280 as discussed herein along with a small text box 217. In response to a user selection of one of the response options or in response to a user click in the text box 217, software code may detect the user selection or click and dynamically insert reply form 200 and/or an expanded text box 220 in place of minimized reply form 215 with minimized text box 217. In yet another embodiment, the software may expand the minimized reply form 215 by dynamically inserting additional lines into the text box 217 of minimized reply form 215.

In the embodiment illustrated in FIG. 2A, response options 260, 270 and 280 may be presented as virtual tabs or links so that the user may toggle between response options. As a user toggles through these tabs, a client computer may not be required to make a server request in response to the user selecting these tabs. Rather, software (such as javascript) may be provided on the client computer that detects the user selection of one of the tabs and populates address boxes 240 and/or 250 with the addresses corresponding to the selected response option. Thus, the user may type or enter a response to the email message 210 and define the characteristics of the response, such as the recipients of the response, without making a specific server request for the response or a response form. This reduction in client-server communication may provide a more efficient email platform in which latency, which is typically caused by generating an email response window and populating the corresponding recipient address field, may be reduced.

Software located on the client computer may also provide a more efficient email response mechanism for the user by allowing the user to toggle through the virtual tabs while maintaining content within the text box 220. For example, the user may initially select the Reply tab 260 and enter a response to the email message 210 within the text box 220. Thereafter, the user may toggle from the Reply tab 260 to the Reply-to-All tab 270. The content within the text box 220 may remain after this toggle without any user action. According to one embodiment, software on the client computer modifies the characteristics of the email response (i.e., changes from Reply response to Reply-to-All response) without erasing or modifying the content with the email response.

In the example illustrated in FIG. 2A, Reply 260 is the selected response option. In one embodiment, Reply 260 is the default response option displayed to the user.

In one embodiment, Reply option 260 may be defined to reply to the sender of the original email message 210. In the embodiment illustrated in FIG. 2A, Tim@example.com sent the email message 210 to which the user is responding so his email address is included in recipient address box 240 since the Reply 260 option is selected. In comparison, the response message will not be sent to Brad@example.com or Greg@example.com because they were not the original sender of email message 210 and thus are not associated with the Reply 260 option.

Figure 2B:
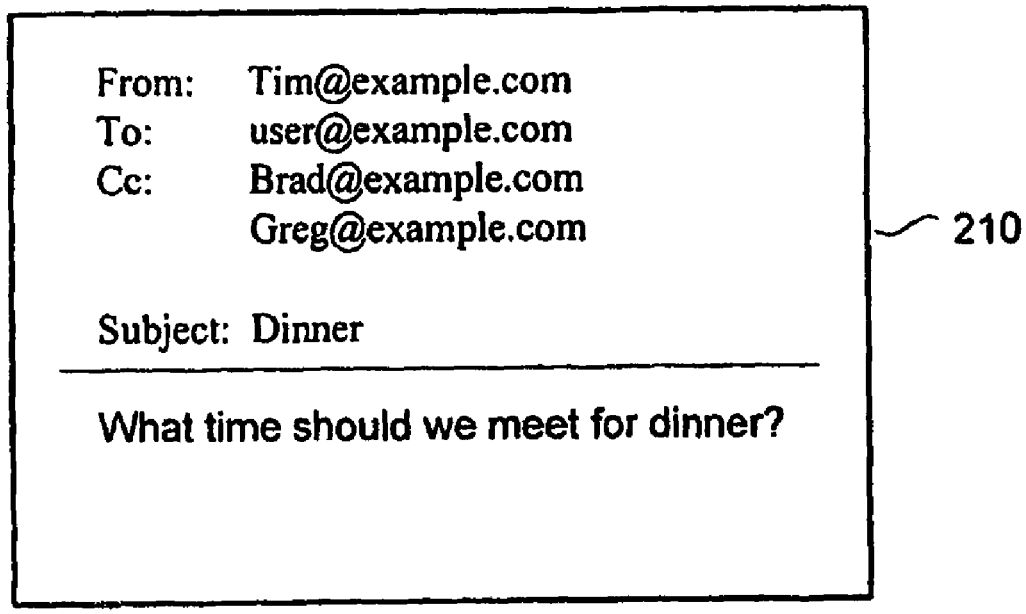
FIG. 2B illustrates a minimized reply form 215 according to one embodiment of the invention.
Figure 2B:
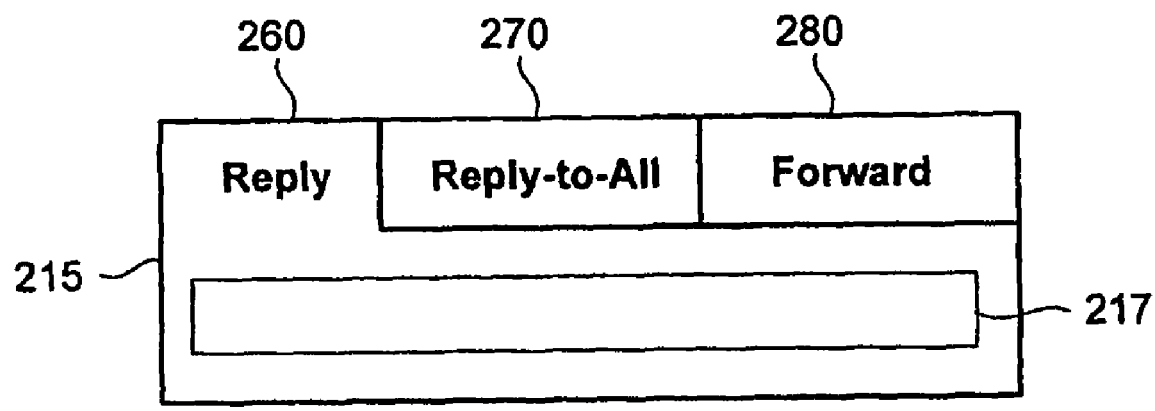
Figure 2C:
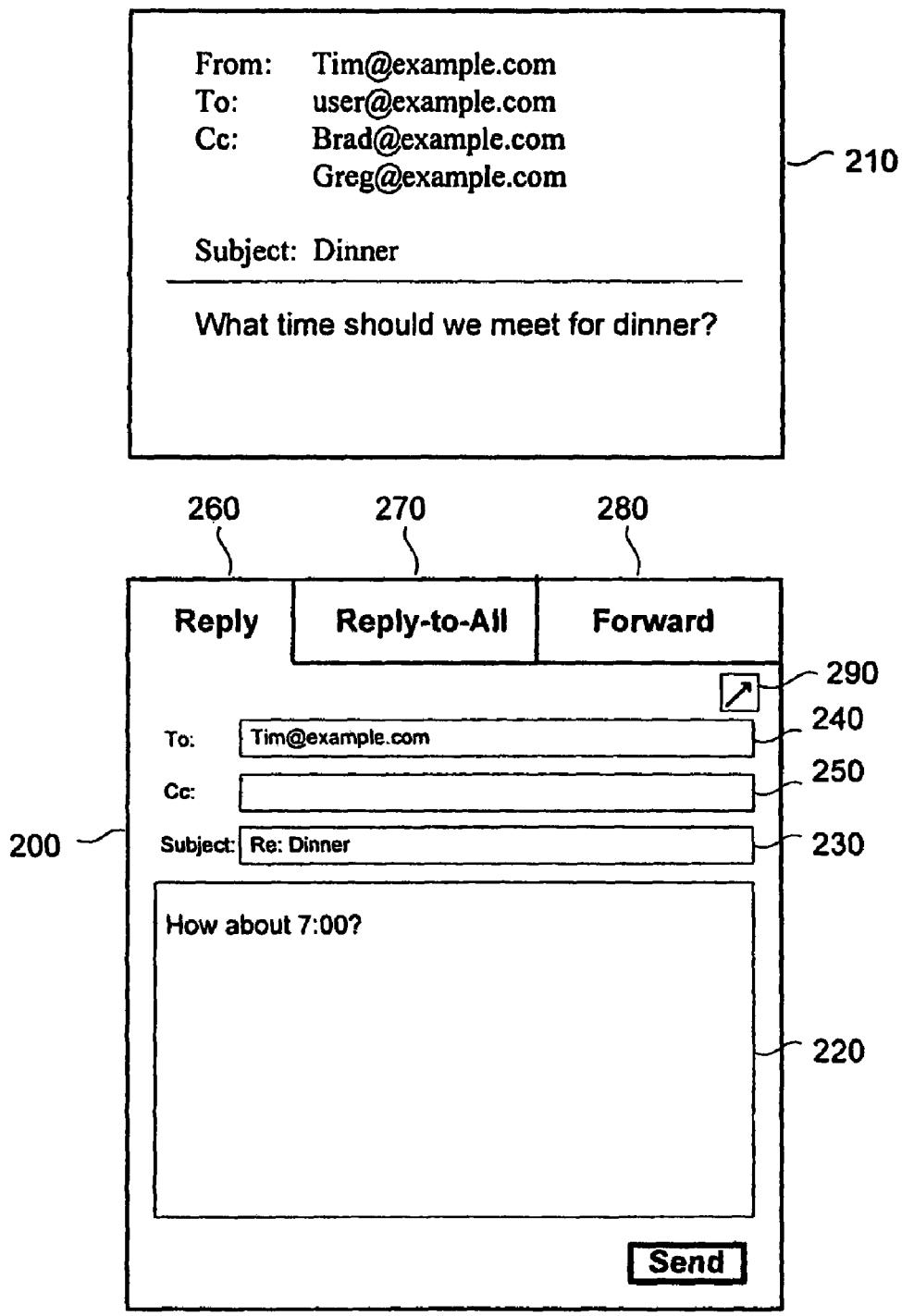
FIG. 2C illustrates a reply form 200 with a response message according to one embodiment of the invention.

In one embodiment, the user may input a response message in text box 220 by clicking text box 220 and inputting the text through a keyboard or other input device. FIG. 2C, illustrates reply form 200 with a response message in text box 220. The response message in text box 220 may not be affected if the user toggles between the various response options.

As mentioned above, the user may toggle between the various response options in order to change the recipient addresses for the response message. For example, if the user wishes to send the message to Tim, Greg and Brad, the user may select the Reply-to-All option 270 within reply form 200. In one embodiment, Reply-to-All option 270 is defined to send the response message to all of the recipients of email message 210.

When the user selects Reply-to-All option 270, software code may detect the selection and dynamically update address boxes 240 and 250 to include the email addresses of the recipients associated with the selected response option. In this example, the software code may populate recipient address box 240 with Tim@example.com and may populate address box 250 with Greg@example.com and Brad@example.com. Each of these email addresses is associated with the Reply-to-All 270 option since it is defined to respond to each recipient of email message 210. In one embodiment, the software code may be embedded within the source code that defines reply form 200. In an alternative embodiment, the software code may be embedded within a hidden frame or second window (not shown in FIG. 2A).

The software code may be configured to monitor and/or receive data regarding user selections within reply form 200. In one embodiment, the software code may parse email message 210 to identify the various recipient email addresses. Based on the location within the email message 210 header, the software code may identify which email addresses to associate with each response option. For example, while parsing email message 210, the software code may identify email addresses located in the "Cc:" field and may assign these addresses to the Reply-to-All option 270. As a result, when a user selects Reply-to-All 270, the software code may populate recipient address box 250 of reply form 200 with the recipient email addresses parsed from the "Cc:" field of email message 210.

In another embodiment, while parsing email message 210, the software code may identify the email addresses located in the "From:" field of email message 210. The software code may associate these email addresses with the Reply 260 and Reply-to-All 270 options. The "From:" field email addresses may be associated with each response option since both are defined to respond to the sender of the original email message 210. As a result, when the user selects either of these response options, the software code may populate recipient text box 240 of reply form 200 with the email addresses parsed from the "From:" field of email message 210.

One skilled in the art will recognize that there are a number of ways to implement the software code described above. In one embodiment, JavaScript or another scripting language may be used to implement the present invention. In one embodiment, the software code may be embedded within the source code that defines reply form 200. In an alternative embodiment, the software code may be embedded within a hidden frame or second window.

Figure 2D:
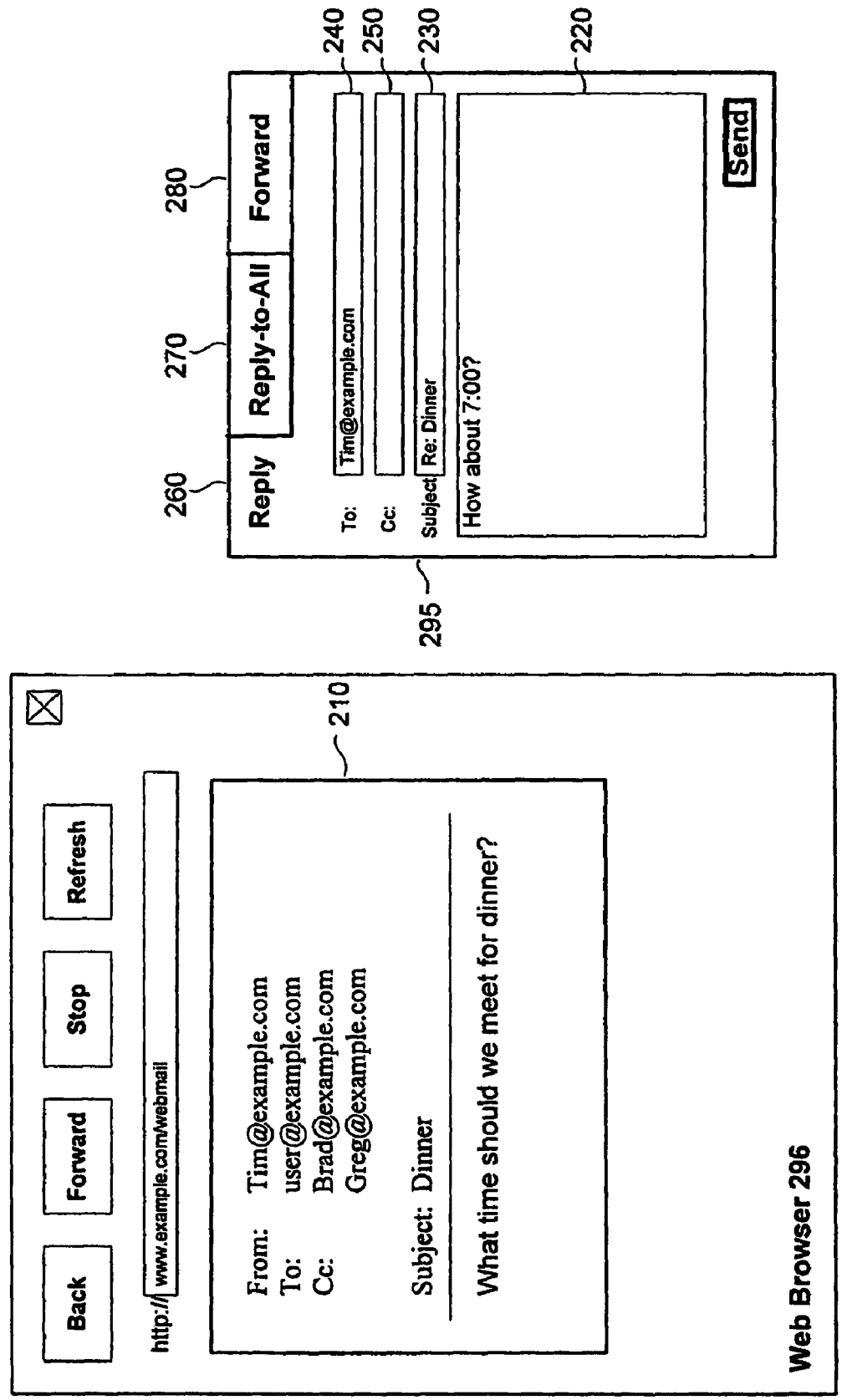
FIG. 2D illustrates a reply form 295 that has been torn away from the window displaying the original email message.

In one embodiment of the invention illustrated in FIG. 2C, a tear off link or button 290 may be included with reply form 200. When a user clicks or otherwise selects tear off button 290, reply form 200 may be torn off of its original display in the same window as email message 210 and displayed in a separate window. FIG. 2D illustrates reply form 295 displayed in a window separate from email message 210. In one embodiment, email message 210 may still be displayed in the original window located within web browser 296. This embodiment of the invention is advantageous because it allows the user to input a response message into reply form 295 while being able to navigate the web browser to a new web page. In another embodiment, when reply form 200 is torn away from the original display window, a new reply form 200 may be inserted below email message 210, allowing the user to draft a second response message separate from the response message being input into the reply form 295 that was torn away from the original display window.

Figure 3A:
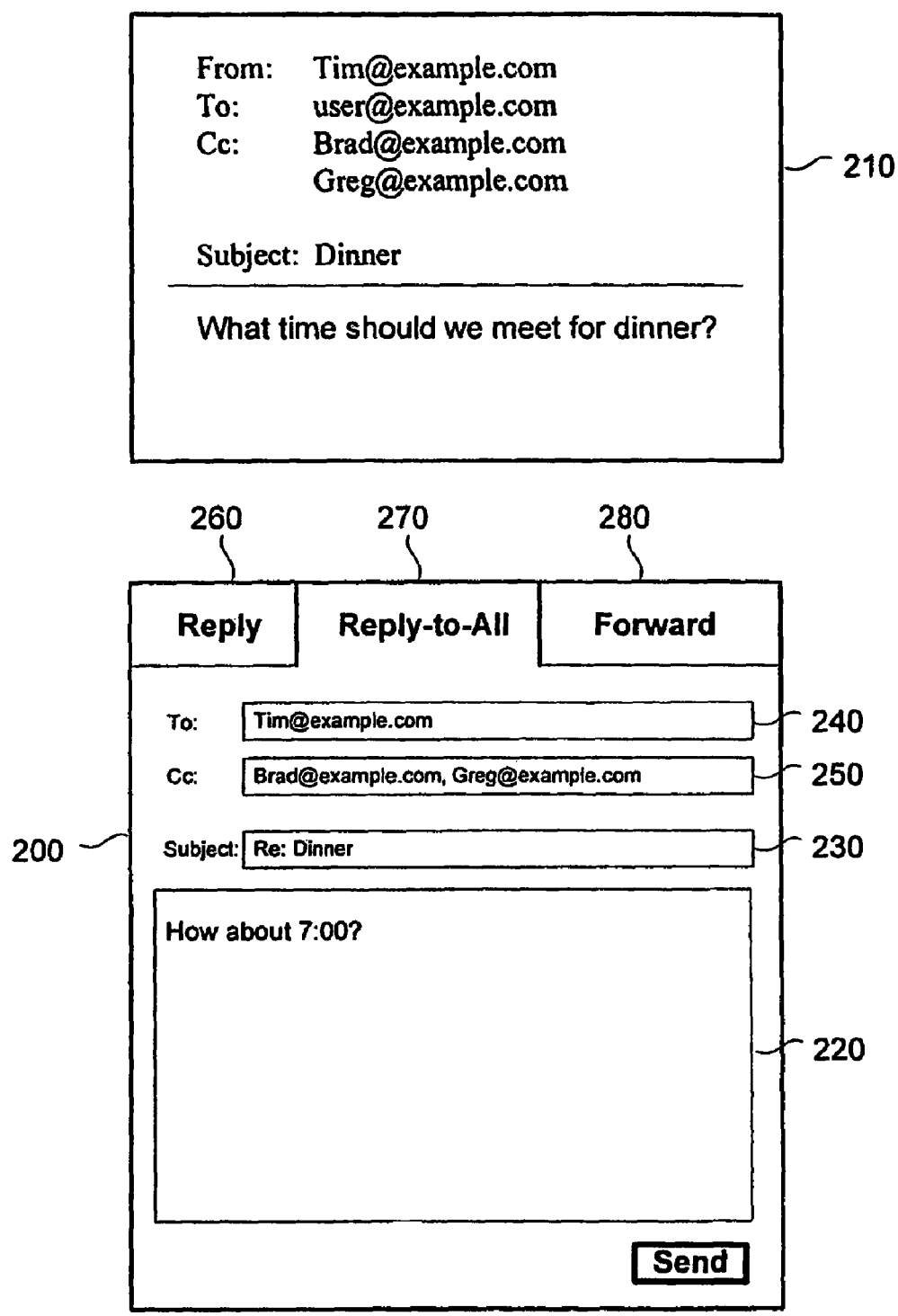
FIG. 3A illustrates a reply form 200 wherein the recipient addresses have been updated in response to a selection of a response option according to one embodiment of the invention.

FIG. 3A illustrates reply form 200 with the recipient addresses updated in response to the user selection of the Reply-to-All 270 option according to one embodiment of the invention. As discussed above, the Reply-to-All 270 option may be defined to send the reply message input into reply form 200 to all of the recipients of email message 210. In the example illustrated, the recipients associated with Reply-to-All option include Tim@example.com, Brad@example.com and Greg@example.com. When the Reply-to-All option 270 was selected by the user, the software code dynamically updated address boxes 240 and 250 with the recipient addresses associated with Reply-to-All option 270.

In one embodiment of the invention, the user may click or otherwise select Send button 290 to send the message input to reply form 200 to the recipients specified in address boxes 240 and 250. In one embodiment, software code may detect the user selection of the send button and initiate the transfer of the message to a remote server for delivery to the specified recipients. In one embodiment, the software code may be embedded within the source code that defines reply form 200. In an alternative embodiment, the software code may be embedded within a hidden frame or second window. In one embodiment, the message may be sent without navigating the user to another web page. In other words, during the process of toggling between response options and sending the message, the same reply form 200 may be displayed to the user.

Figure 3B:
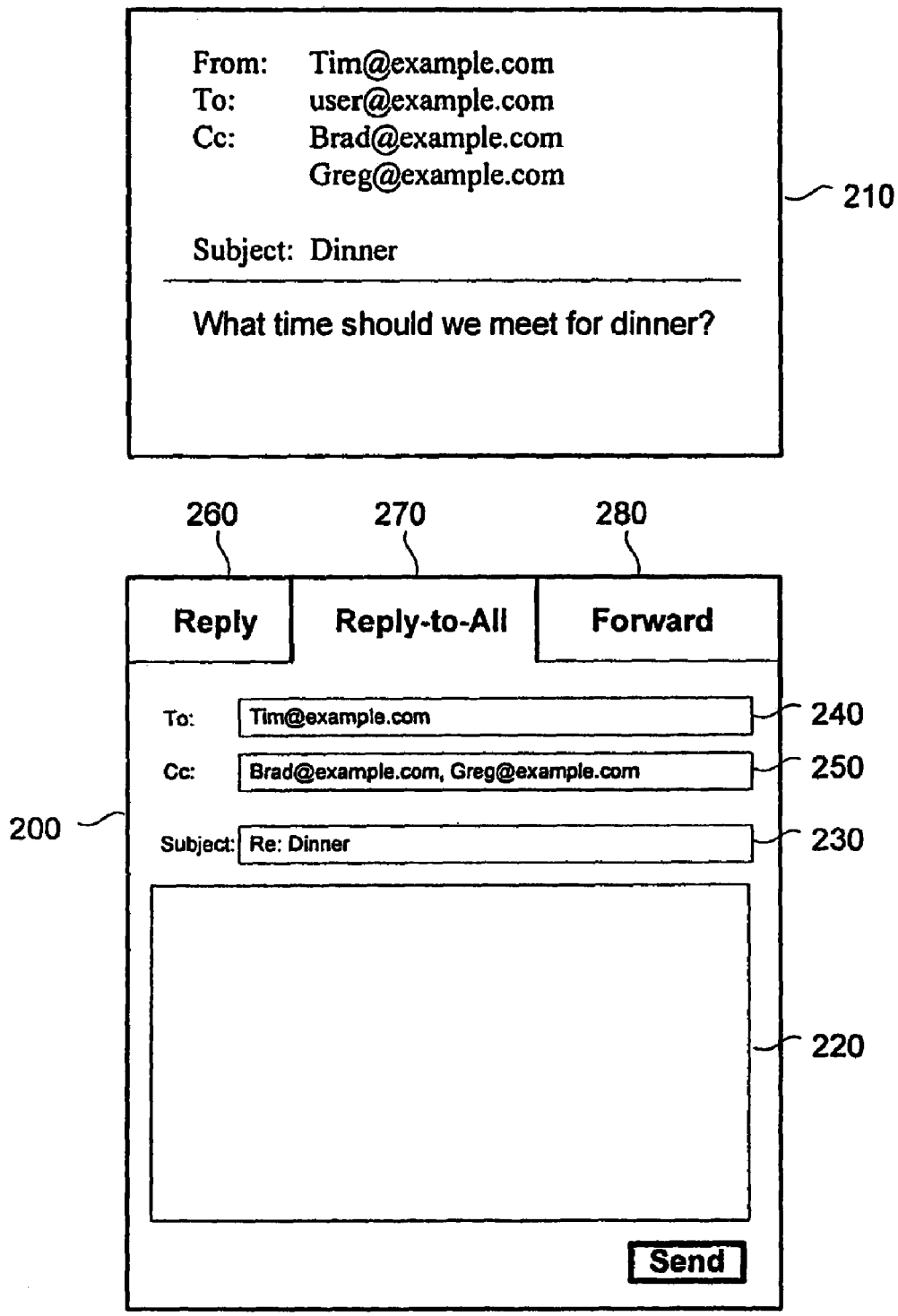
FIG. 3B illustrates a reply form 200 following the sending of a response message according to one embodiment of the invention.

In one embodiment of the invention, a confirmation message indicating that the message has been sent may be inserted in place of the reply form when the message has been sent. In another embodiment, the software code may be configured to remove the contents of text box 220 after the user has clicked on the send button and the message delivery has been initiated. As illustrated in FIG. 3B, the same reply form 200 may be displayed to the user with the contents of the text box deleted. As a result, the user may immediately begin creating a second response email. In one embodiment, reply form 200 maintains the same response option as the previously sent response message. In the example illustrated, the Reply-to-All 270 option remains the selected response option. In an alternative embodiment, reply form 200 may automatically toggle back to the default Reply option 260 after a response message has been sent. In either case, the user may again toggle between the various response options by simply selecting one of the other response options.

Figure 4A:
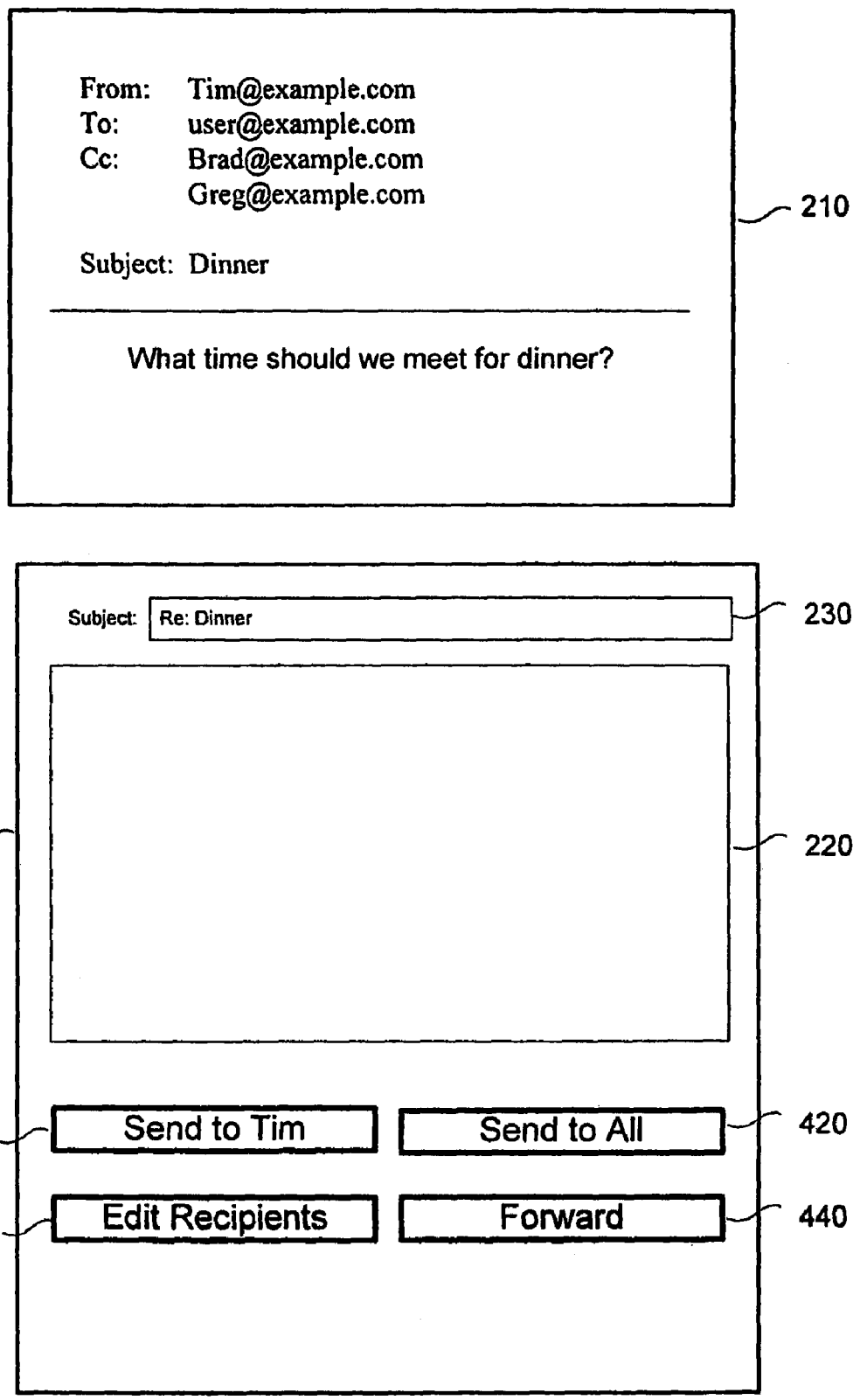
FIG. 4A illustrates a reply form 400 with response buttons according to one embodiment of the invention.

One skilled in the art will recognize that the invention is not limited to virtual tabs and that there are a number of other ways to display response options 260, 270 and 280 to a user, including but not limited to links and buttons. In one embodiment, illustrated in FIG. 4, a reply form 400 may be provided to a user with multiple response options provided to the user as a plurality of response buttons 410, 420, 430 and 440 that also initiate the sending of the message. Reply form 400 may include a subject box 230 and a text box 220 for inputting a response message.

In one embodiment, response button 410 may represent the reply option. When the user selects response button 410, software code may initiate the sending of the message input into text box 220 to the sender of the original message 210. In this example, Tim@example.com. Response button 420 may represent the reply-to-all option. When the user selects response button 420, software code may initiate the sending of the message input into text box 220 to all of the recipients of the original message 210. In this example, the message would be sent to Tim@example.com, Brad@example.com and Greg@example.com.

Figure 4B:
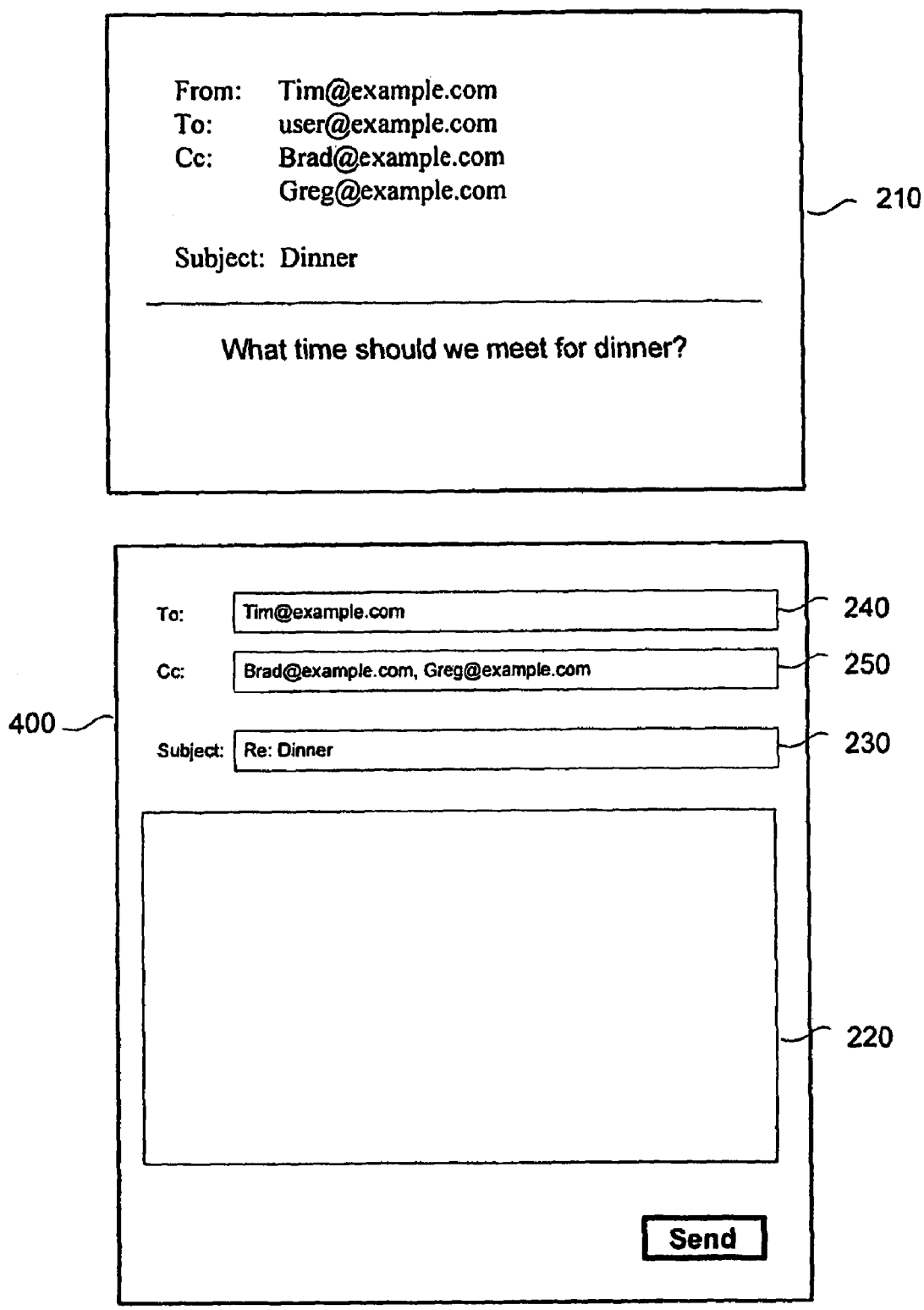
FIG. 4B illustrates a reply form according to one embodiment of the invention.

In yet another embodiment, when the user selects the Edit Recipients response button 430, software code may dynamically insert the To: and Cc: address boxes 240 and 250 into reply form 400 along with a Send button as illustrated in FIG. 4B. In one embodiment, address boxes 240 and 250 may be populated with the recipient addresses associated with a reply-to-all option. The user may edit the addresses, add new addresses or delete one or more addresses from address boxes 240 and 250.

Similarly, when the user selects the Forward response button 440, software code may insert the To: and Cc: address boxes 240 and 250 into reply form 200 along with a Send button as illustrated in FIG. 4B. However, in this embodiment, address boxes 240 and 250 may be left empty, allowing the user to input the intended recipients. The software code may also include the text of the original message 210 in text box 220 along with a forward header. The forward header may include information identifying the sender of message 210, the date message 210 was sent, the subject of message 210 and the recipients of message 210.

Figure 5:
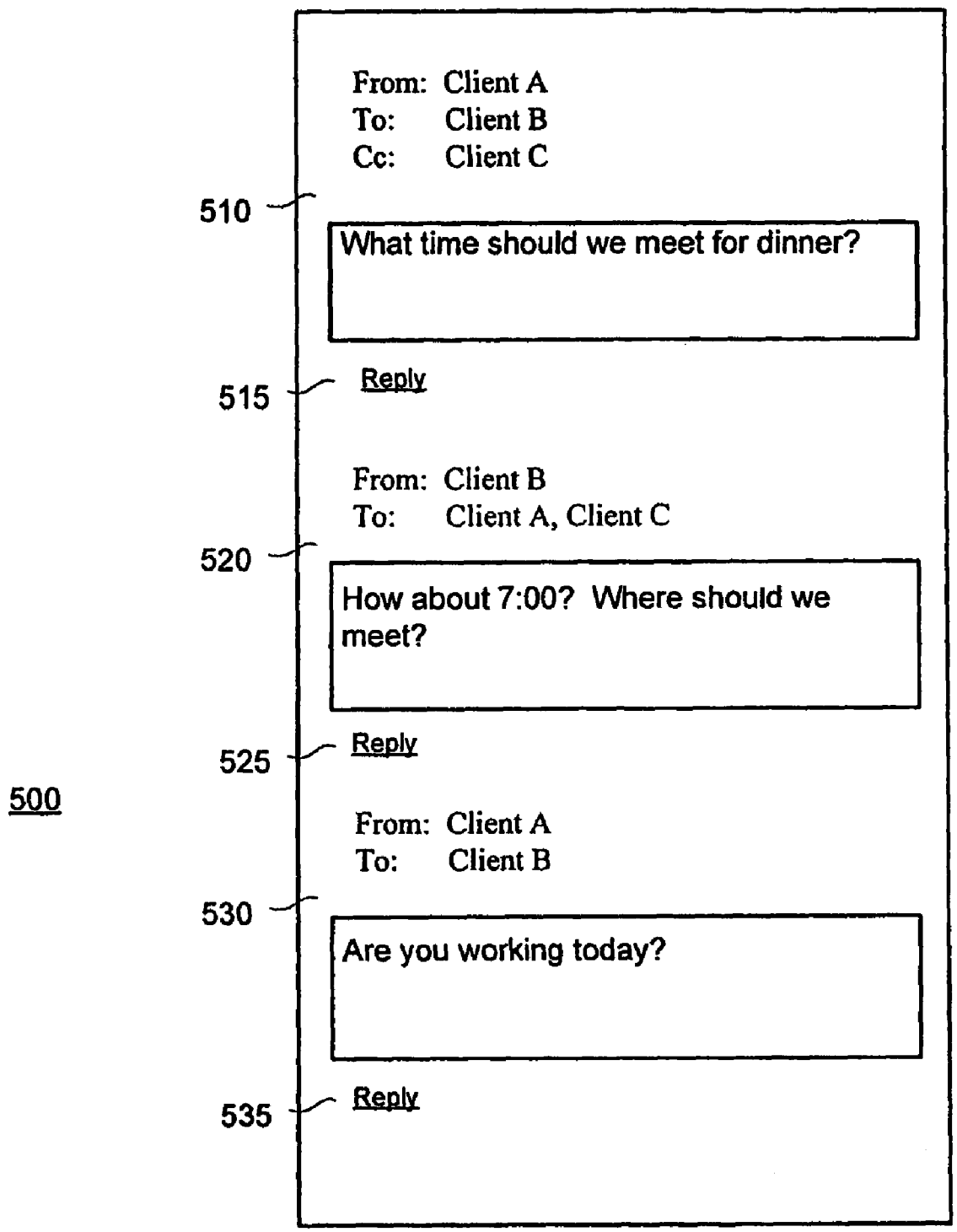
FIG. 5 illustrates an email thread 500 according to one embodiment of the invention.

FIG. 5 illustrates multiple email messages 510, 520 and 530 that make up an email thread 500. Below each email message 510, 520 and 530 is a reply link 515, 525 and 535, respectively. In one embodiment of the invention, a reply mechanism such as a reply link or other selection means may be associated with each email message that makes up email thread 500. The user may select one of the reply mechanisms to respond to the associated email message within email thread 500. In the embodiment illustrated in FIG. 5, reply links 515, 525 or 535 are provided to respond to the email message associated with the reply link. Software code may detect a user selection of the reply link and insert a reply form 200 below the message to which the user wants to respond. In one embodiment, the software code may be embedded within the source code that defines email thread 500. In an alternative embodiment, the software code may be embedded within a hidden frame or second window within the web browser.

In another embodiment, when a user selects reply link 525 a reply form 200 is inserted below email message 520 as illustrated in FIG. 6A. In yet another embodiment of the invention, the user may click on multiple reply links 515, 525 and/or 535 to open multiple reply forms. As a result, the user may simultaneously input responses to multiple messages at the same time.

In a further embodiment of the invention, a reply link may be provided for each response option supported. For example, a reply link may be provided for Reply 260 option, Reply-to-All 270 option and Forward 280 option. When the user selects one of the response options, a reply form 200 may be dynamically inserted below the email message associated with the reply link. Software code may populate address boxes 240 and 250 based on the selected response option. In addition, the user may still toggle between the response options within reply form 200 as described above.

In an alternative embodiment, the reply links located below each email message within email thread 500 may be replaced with minimized reply forms 215 illustrated in FIG. 2B. As discussed above, in response to a user selection of one of the response options or in response to a user click in the text box of minimized reply form 215, software code may detect the user selection or click and dynamically insert reply form 200 and/or an expanded text box 220 in place of minimized reply form 215 with minimized text box 217. In yet another embodiment, the software may expand the minimized reply form 215 by dynamically inserting additional lines into the text box 217 of minimized reply form 215. The user may select multiple minimized reply forms 215 within email thread 500, allowing the user respond to multiple email messages within email thread 500 at the same time.

In one embodiment of the invention illustrated in FIG. 6B, when a user selects the send button within reply form 200 of email thread 500, the text of the reply message may be inserted into the thread view. As illustrated in this embodiment, the messages within thread 500 may be indented or otherwise distinguished to provide the user with a visual representation of each message within email thread 500.

FIG. 7 illustrates a method 700 for updating the recipient addresses of a response email in response to user selection of a response option according to one embodiment of the invention. In step 710, a reply form for responding to a first electronic mail (email) message may be provided to a user. The reply form may include a text box for inputting the response message and one or more address boxes for inputting the addresses of the intended recipients of the response message.

In step 720, a plurality of response options may be provided to the user. The response options may be part of the reply form or may in some way be associated with the reply form. In one embodiment, the response options include the Reply option, the Reply-to-All option, and the Forward option. There are a number of ways in which the response options may be presented to the user, including presenting the response options as virtual tabs, links and or buttons. Each response option may be associated with a subset of the recipients of the email message to which the user is responding.

In step 730, a user selection of one of the plurality of response options may be detected. In one embodiment, software code detects the selection of one of the response options. The software code may determine which recipient addresses are associated with the selected response option. In one embodiment, the first email message may be parsed to locate the various recipients and sender of the first email message. These email addresses may be associated with various response options.

In step 740, the recipient addresses of the response message are updated in response to the selected response option. In one embodiment, software code may dynamically update or replace the recipient email addresses of the reply form with the recipient addresses associated with the selected response option. This may consist of removing email addresses from the reply form that are not associated with the selected response option. This may also consist of populating the reply form with recipient email addresses that are associated with the selected response option.

While the present invention has been described with reference to certain embodiments, those skilled in the art will recognize that various modifications may be provided. For example, though the invention has been discussed with reference to various response options, one skilled in the art will recognize that the invention is not limited to these response options. Other response options may be defined that are part of the present invention. In addition, there are numerous programming languages, including JavaScript, that may be used to implement the invention. Variations upon and modifications to the embodiments are provided for by the present invention, which is limited only by the following claims.

What is claimed is:

1. A graphical user interface on a computer, comprising:
    a web mail reply form that includes:
        one or more address fields;
        an input area for a reply message; and
        a plurality of response options selectable by a user; and
    software code configured to receive selections made by the user within the web mail reply form to determine which of the plurality of response options is selected;
    wherein:
        in response to selection of a reply response option by the user when the one or more address fields correspond to a reply-to-all response or a forward response, one or more of the address fields in the web mail reply form are changed while maintaining the reply message in the input area;
        in response to selection of a reply-to-all response option by the user when the one or more address fields correspond to a reply response or a forward response, one or more of the address fields in the web mail reply form are changed while maintaining the reply message in the input area; and
        in response to selection of a forward response option by the user when the one or more address fields correspond to a reply response or a reply-to-all response, one or more of the address fields in the web mail reply form are changed while maintaining the reply message in the input area.

2. The graphical user interface of claim 1, wherein the one or more of the address fields in the web mail reply form are changed without requesting a new web mail reply form.

3. The graphical user interface of claim 1, wherein the software code is JavaScript.

4. The graphical user interface of claim 1, wherein the software code is embedded within source code that defines the web mail reply form.

5. The graphical user interface of claim 1, wherein the software code is embedded within a hidden frame.

6. The graphical user interface of claim 1, wherein the web mail reply form is displayed in a first window and the software code is embedded within a second window other than the first window.

7. The graphical user interface of claim 1, wherein the software code is further configured to identify at least one of the one or more address fields within a from field of the web mail reply form.

8. A computer-implemented method, comprising: at a computer,
    displaying a web mail reply form that includes:
        one or more address fields;
        an input area for a reply message; and
        a plurality of response options selectable by a user; and
    receiving selections made by the user within the web mail reply form, wherein the receiving is performed by software code configured to determine which of the plurality of response options is selected;
    in response to selection of a reply response option by the user when the one or more address fields correspond to a reply-to-all response or a forward response, changing one or more of the address fields in the web mail reply form while maintaining the reply message;
    in response to selection of a reply-to-all response option by the user when the one or more address fields correspond to a reply response or a forward response, changing one or more of the address fields in the web mail reply form while maintaining the reply message in the input area; and
    in response to selection of a forward response option by the user when the one or more address fields correspond to a reply response or a reply-to-all response, changing one or more of the address fields in the web mail reply form while maintaining the reply message in the input area.

9. The method of claim 8, wherein the one or more of the address fields in the web mail reply form are changed without requesting a new web mail reply form.

10. The method of claim 8, wherein the software code is JavaScript.

11. The method of claim 8, wherein the software code is embedded within source code that defines the web mail reply form.

12. The method of claim 8, wherein the software code is embedded within a hidden frame.

13. The method of claim 8, wherein the web mail reply form is displayed in a first window and the software code is embedded within a second window other than the first window.

14. The method of claim 8, wherein the software code is further configured for identifying at least one of the one or more address fields within a from field of the web mail reply form.

15. A computer, wherein the computer is configured to:
  display a web mail reply form that includes:
    one or more address fields;
    an input area for a reply message; and
    a plurality of response options selectable by a user; and
  receive selections made by the user within the web mail reply form, wherein the receiving is performed by software code configured to determine which of the plurality of response options is selected;
  in response to selection of a reply response option by the user when the one or more address fields correspond to a reply-to-all response or a forward response, change one or more of the address fields in the web mail reply form while maintaining the reply message;
  in response to selection of a reply-to-all response option by the user when the one or more address fields correspond to a reply response or a forward response, change one or more of the address fields in the web mail reply form while maintaining the reply message in the input area; and
  in response to selection of a forward response option by the user when the one or more address fields correspond to a reply response or a reply-to-all response, change one or more of the address fields in the web mail reply form while maintaining the reply message in the input area.

16. The computer of claim 15, wherein the one or more of the address fields in the web mail reply form are changed without requesting a new web mail reply form.

17. The computer of claim 15, wherein the software code is JavaScript.

18. The computer of claim 15, wherein the software code is embedded within source code that defines the web mail reply form.

19. The computer of claim 15, wherein the software code is embedded within a hidden frame.

20. The computer of claim 15, wherein the web mail reply form is displayed in a first window and the software code is embedded within a second window other than the first window.

21. The computer of claim 15, wherein the software code is further configured to identify at least one of the one or more address fields within a from field of the web mail reply form.

22. A computer readable storage medium and a computer program mechanism embedded therein, the computer program mechanism comprising instructions, which when executed by a computer, cause the computer to:
  display a web mail reply form that includes:
    one or more address fields;
    an input area for a reply message; and
    a plurality of response options selectable by a user; and
  receive selections made by the user within the web mail reply form, wherein the receiving is performed by software code configured to determine which of the plurality of response options is selected;
  in response to selection of a reply response option by the user when the one or more address fields correspond to a reply-to-all response or a forward response, change one or more of the address fields in the web mail reply form while maintaining the reply message;
  in response to selection of a reply-to-all response option by the user when the one or more address fields correspond to a reply response or a forward response, change one or more of the address fields in the web mail reply form while maintaining the reply message in the input area; and
  in response to selection of a forward response option by the user when the one or more address fields correspond to a reply response or a reply-to-all response, change one or more of the address fields in the web mail reply form while maintaining the reply message in the input area.

23. A computer, comprising:
  means for displaying a web mail reply form that includes:
    one or more address fields;
    an input area for a reply message; and
    a plurality of response options selectable by a user; and
  means for receiving selections made by the user within the web mail reply form, wherein the receiving means includes software code configured to determine which of the plurality of response options is selected;
  means, responsive to selection of a reply response option by the user when the one or more address fields correspond to a reply-to-all response or a forward response, for changing one or more of the address fields in the web mail reply form while maintaining the reply message;
  means, responsive to selection of a reply-to-all response option by the user when the one or more address fields correspond to a reply response or a forward response, for changing one or more of the address fields in the web mail reply form while maintaining the reply message in the input area; and
  means, responsive to selection of a forward response option by the user when the one or more address fields correspond to a reply response or a reply-to-all response, for changing one or more of the address fields in the web mail reply form while maintaining the reply message in the input area.

24. A computer, wherein the computer is configured to:
  send software code and data to a client computer, wherein the software code is configured to:
    display a web mail reply form that includes:
      one or more address fields;
      an input area for a reply message; and
      a plurality of response options selectable by a user; and
    receive selections made by the user within the web mail reply form;
    in response to selection of a reply response option by the user when the one or more address fields correspond to a reply-to-all response or a forward response, change one or more of the address fields in the web mail reply form while maintaining the reply message;
    in response to selection of a reply-to-all response option by the user when the one or more address fields correspond to a reply response or a forward response, change one or more of the address fields in the web mail reply form while maintaining the reply message in the input area; and
    in response to selection of a forward response option by the user when the one or more address fields correspond to a reply response or a reply-to-all response, change one or more of the address fields in the web mail reply form while maintaining the reply message in the input area.

* * * * *